(12) United States Patent
Truhill (10) Patent No.: US 9,945,319 B1
(45) Date of Patent: Apr. 17, 2018

(54) METHOD AND FUEL SUPPLY SYSTEM FOR A PROGRESSIVE IMPULSE INTERNAL COMBUSTION ENGINE

(71) Applicant: Richard Truhill, Plano, TX (US)

(72) Inventor: Richard Truhill, Plano, TX (US)

( * ) Notice: Subject to any disclaimer, the term of this patent is extended or adjusted under 35 U.S.C. 154(b) by 197 days.

(21) Appl. No.: 14/887,439

(22) Filed: Oct. 20, 2015

Related U.S. Application Data (60) Provisional application No. 62/184,718, filed on Jun. 25, 2015.

(51) Int. Cl.
  *F02F 3/24* (2006.01)
  *F02B 23/00* (2006.01)
  *F02F 1/22* (2006.01)

(52) U.S. Cl.
  CPC ............... *F02F 3/24* (2013.01); *F02B 23/00* (2013.01); *F02F 1/22* (2013.01)

(58) Field of Classification Search
  CPC ....... F02F 3/24; F02F 1/22; F02F 3/28; F02B 23/00
  See application file for complete search history.

(56) References Cited

U.S. PATENT DOCUMENTS

| | | | | |
|---|---|---|---|---|
| 1,410,776 A | * | 3/1922 | Victor ...................... | F02F 3/24 123/193.4 |
| 2005/0081819 A1 | * | 4/2005 | Kim ..................... | F02B 23/0627 123/279 |
| 2009/0071433 A1 | * | 3/2009 | Bando ........................ | F16J 9/00 123/193.6 |
| 2011/0048366 A1 | * | 3/2011 | Tsuchida .................. | F01M 1/08 123/193.6 |
| 2013/0167798 A1 | * | 7/2013 | Lawler ...................... | F02F 1/18 123/193.4 |

* cited by examiner

*Primary Examiner* — Jacob Amick
(74) *Attorney, Agent, or Firm* — Richard G. Eldredge; Eldredge Law Firm (57) ABSTRACT

A piston system includes a piston housing having a cylindrical body and forming an opening; a piston head positioned within and slidingly engaged with the opening; a first conduit extending from a side of the piston head to a top surface of the piston head; a first pocket extending partially within the cylindrical body of the piston housing.

8 Claims, 7 Drawing Sheets

METHOD AND FUEL SUPPLY SYSTEM FOR A PROGRESSIVE IMPULSE INTERNAL COMBUSTION ENGINE

BACKGROUND

1. Field of the Invention

The present invention relates generally to internal combustion engines, and more specifically, to a method and fuel supply system for a progressive impulse internal combustion engine.

2. Description of Related Art

Figures 1, 2:
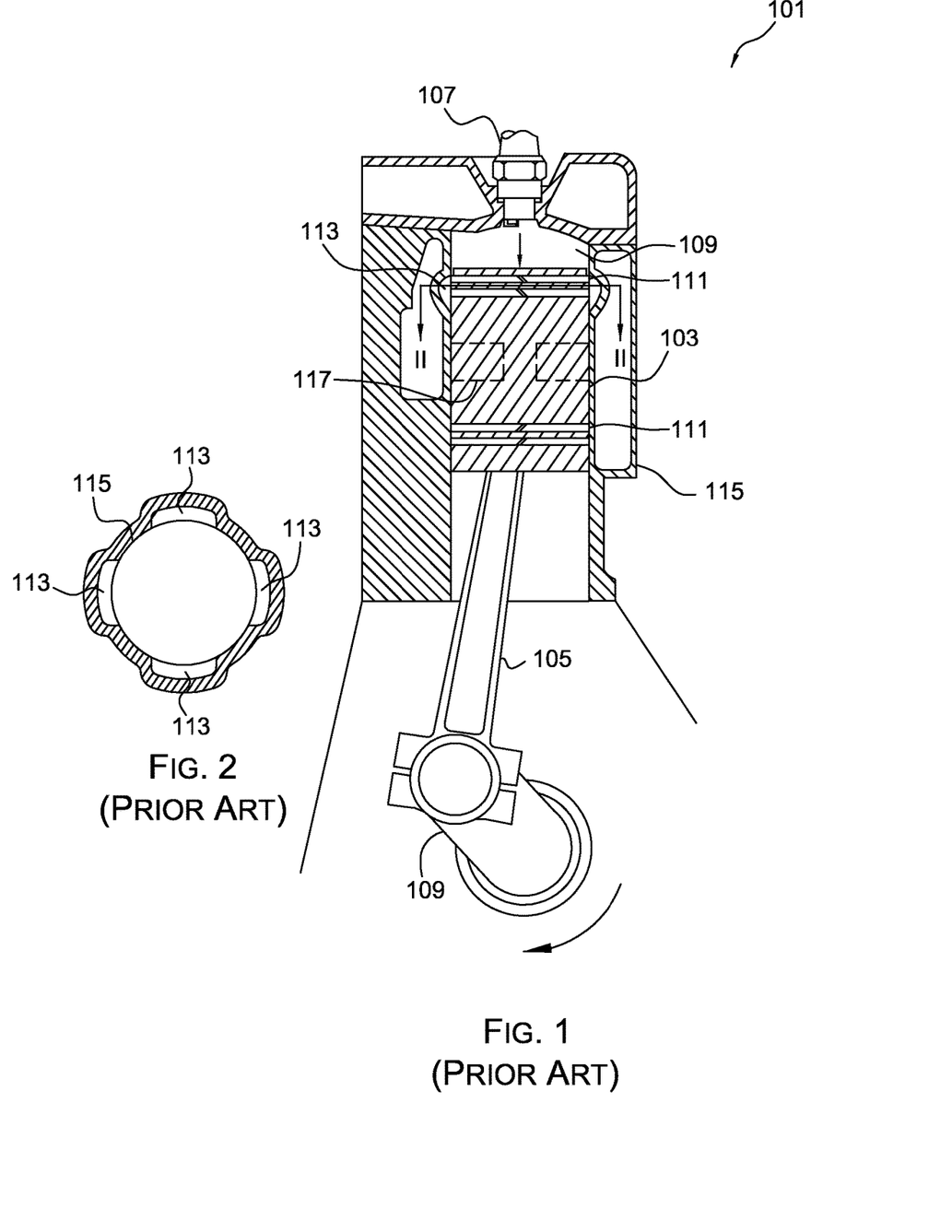
FIGS. 1 and 2 are section views of a conventional progressive impulse internal combustion engine.

Progressive impulse internal combustion engines are known in the art and provide a viable means of increasing the volumetric efficiency of an engine. In FIGS. 1 and 2, a conventional progressive impulse internal combustion engine system 101 is shown. System 101 depicts a cylinder of a single or multi-cylinder internal combustion engine in which the cylinders could be arranged in many ways; e.g. inline, V-shaped, W-shaped, L-shaped, and so forth. System 101 includes a cylinder 115, piston 103, and connection rod 105. The piston 103 contains one or more rings 111 as depicted. The engine could be 2-stroke, 4-stroke, air cooled, or water cooled and could be used in vehicles, aircraft, boats, models, tools, etc.

The principle constructional feature of the system 101 resides in the provision of the series of pockets in the cylinder wall. As shown, eight of the pockets are provided, one set of four pockets 113 toward the upper part of the cylinder wall, distributed substantially equal distant therearound and a second set of four pockets 117 somewhat further down and arranged in staggered relation to the pockets 113 of the upper set.

The upper pocket or pockets 113 are so arranged that they will have been sealed by the piston in its upward passage-prior to the earliest possible point of ignition. Ignition in the compression space 109 is preferably from a spark plug 107 or diesel ignition. As shown in FIG. 1 the upper pockets 113 are closed when the piston is about 45° of the rotation of crank shaft 105 from the upper limit of piston movement. The lowermost pocket or pockets, as pockets 117, are located sufficiently high up on the cylinder wall to enable the power impulse from combustion of gases trapped therein to become effective materially before the piston reaches the bottom of the power stroke.

On the compression stroke, portions of the charge, more or less compressed, according to height of piston stroke reached before the respective pocket is sealed by the piston, are trapped in the pockets 113 and 117.

On the power stroke the charge in compression space 109 over the head is ignited, the resulting pressure acting to force the piston down, and as the pockets 113 are uncovered the portions of the charges contained therein are also ignited and burned, producing a supplemental power impulse, and this is repeated as pockets 117 are unsealed. The pockets being relatively abruptly recessed at the top produces a downward reaction as ignition takes place, and being of taper recess at the bottom prevents any substantial reaction in the opposite direction.

System 101 is an exemplary embodiment of a progressive impulse engine with many advantages; however, the compressed fuel delivery to the pockets during the compression stroke is limited due to the lack of delivery during full compression. Since the pockets are located at varying heights along the cylinder wall 115, the compressed fuel will be sealed in the pockets 113 and 117 as the piston 103 travels over the pocket at varying compression ratios with the lower ratio occurring when the piston 103 is at the bottom of its stroke. Therefore, the pockets 113 and 117 cannot be taken full advantage of because of the limited compression of fuel stored. This is viewed as a disadvantage of conventional progressive impulse internal combustion engines.

Although great strides have been made in the area of progressive impulse internal combustion engine systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional progressive impulse internal combustion engine systems. Specifically, the system of the present application provides a method of compressed fuel delivery to the pockets of the cylinder which maximizes the compression ratio of the fuel in the said pockets. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
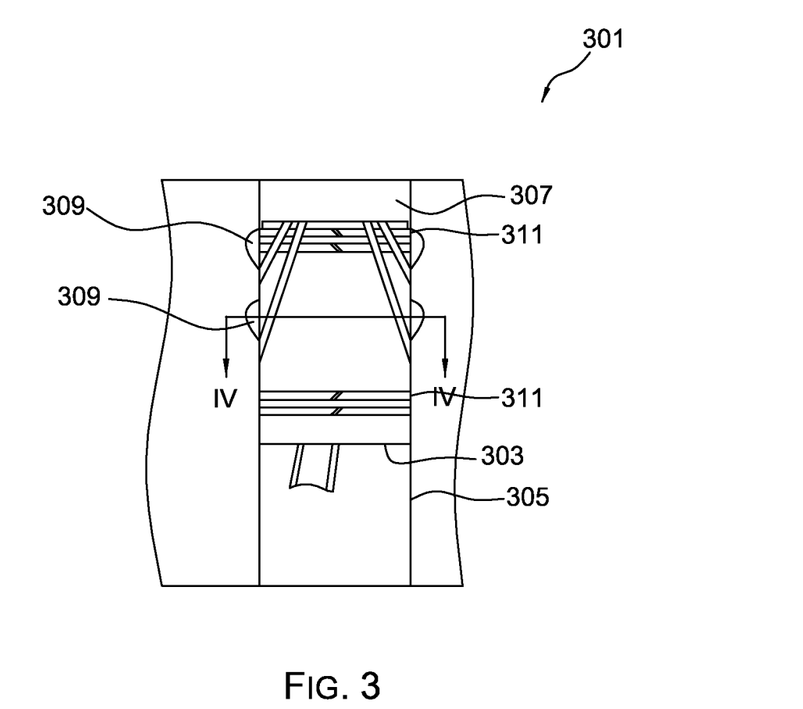
FIGS. 3 and 4 are section views in accordance with a preferred embodiment of the present application.
Figure 4:
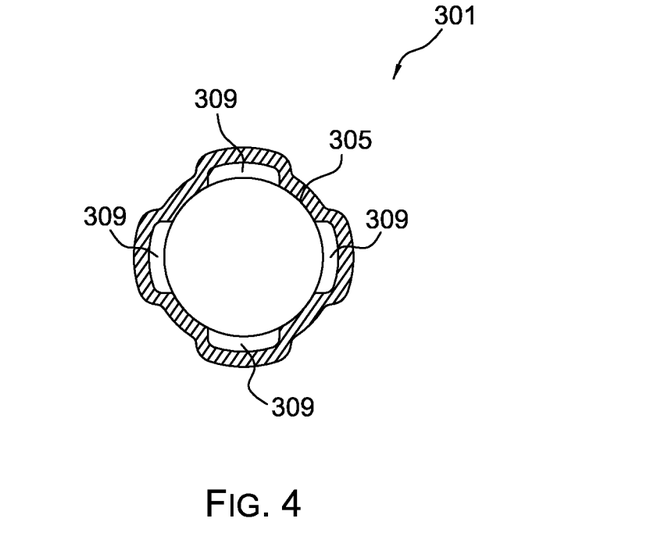

Referring now to the drawings wherein like reference characters identify corresponding or similar elements throughout the several views, FIGS. 3 and 4 depict a progressive impulse internal combustion engine in accordance with a preferred embodiment of the present application. It will be appreciated that the progressive impulse engine system 301 overcomes one or more of the above-listed problems commonly associated with conventional progressive impulse internal combustion engine systems.

In a preferred embodiment, system 301 includes a piston head 303 with one or more rings 311 and housing 305. The housing 305 contains one or more sets of pockets 309 partially extending within the walls of the housing 305, as depicted. It is contemplated that in the preferred embodiment, the said pockets 309 can be of any shape (circular, elliptical, etc) or depth within the cylindrical wall. System 301 maximizes volumetric efficiency by applying higher pressure throughout the power stroke, thus taking advantage of a longer moment arm, resulting in a greater net torque. This is viewed as an advantage of the system of the present application.

The cylinder wall contains pockets 309, which store part of the intake gases during the compression stroke. The said stored gases can be introduced into the combustion chamber 307 later in the power stroke, resulting in a flatter pressure versus volume (PV) curve. This results in greater torque throughout the power stroke since the pressure is applied to a longer moment arm. The same amount of fuel/air mixture is compressed at the same compression ratio; however, the staged burning of the mixture applies the force while the moment arm is longer. This is viewed as an advantage of the system of the present application.

Figure 5:
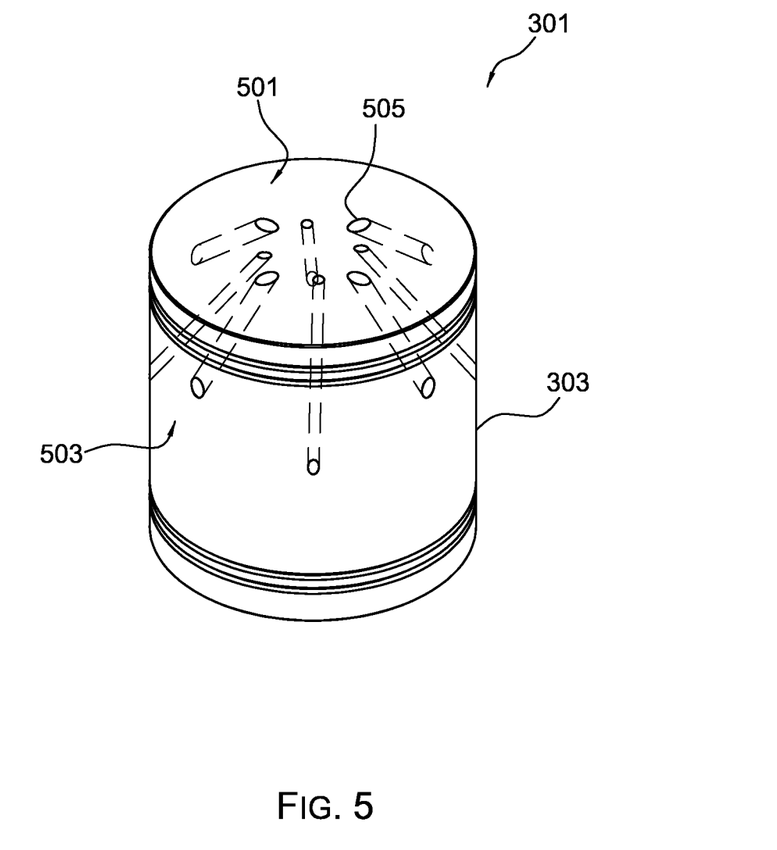
FIG. 5 is an oblique view of the piston of FIGS. 3 and 4.

In FIG. 5, an oblique view of the piston head 303 of system 301 is depicted. The piston head 303 contains a plurality of staggered, angular holes through surfaces 501 and 503 to act as compression conduits 505. The compression conduits 505 provide a means of delivery of the compressed intake gases to the pockets 309 in FIGS. 3 and 4.

In the contemplated embodiment, the compression conduits 505 extend through the head of the piston and are in gaseous communication with cylinder pockets 309. Accordingly, the conduits 505 allows gas to travel from the pockets 505 to a top surface of the piston head 303, as depicted in at least FIG. 5.

Figure 6A:
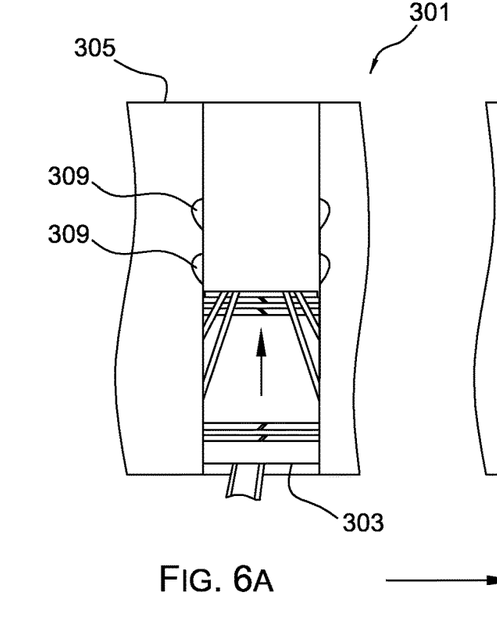
FIGS. 6A, 6B, 6C, 6D, and 6E are section views of the progressive impulse system of FIGS. 3, 4, and 5.
Figure 6B:
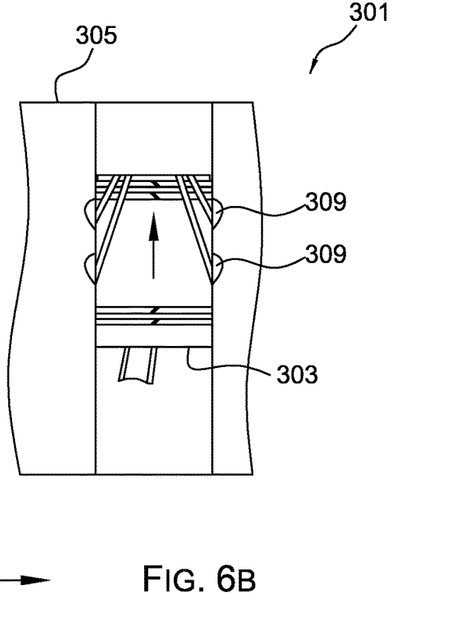
Figure 6C:
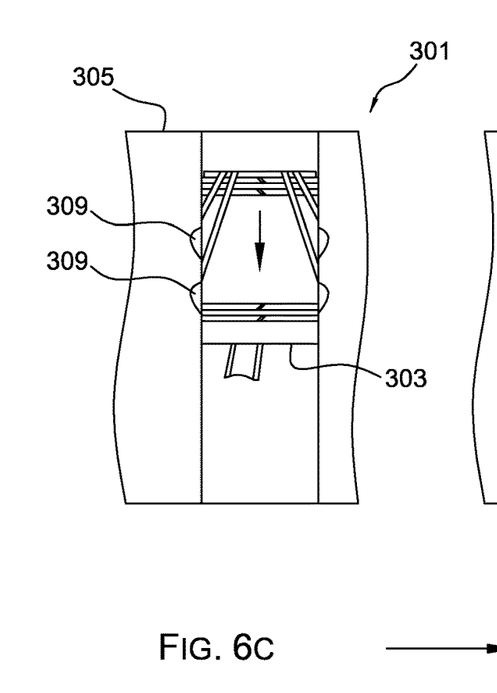

Referring now to FIGS. 6A, 6B, 6C, 6D, and 6E section views of systems 301 are given which show the compression and power strokes. The start of the compression stroke is shown in FIG. 6A. As the piston head 303 moves up, the compression conduits 505 begin to transfer the intake gases into the pockets 309 as can be seen in FIG. 6B. As the piston reaches the top of the compression stroke in FIG. 6C, the pockets are sealed and ignition begins. The piston head 303 moves downward during the power stroke in FIG. 6D and the length of the compression conduits 505 provide a flame path too long for ignition to reach the pockets 309 prior to the piston head 303 moving past them. Finally, as the piston head 303 moves downward in FIG. 6E, the pockets become exposed to the combustion chamber 307, allowing compressed intake gases to ignite, thus increasing the pressure of ignition in stages.

Figure 6D:
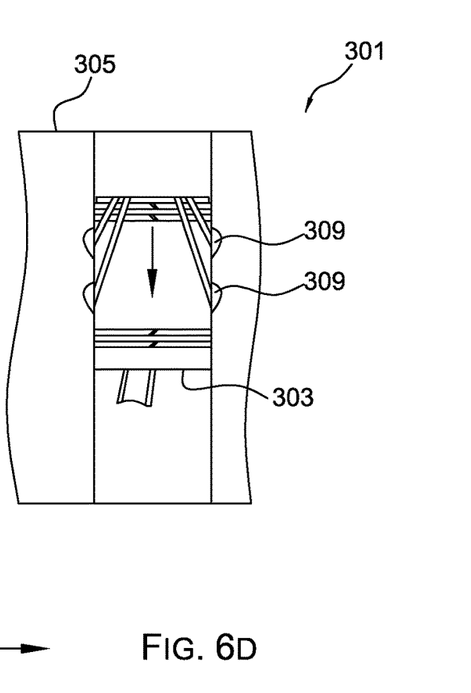
Figure 6E:
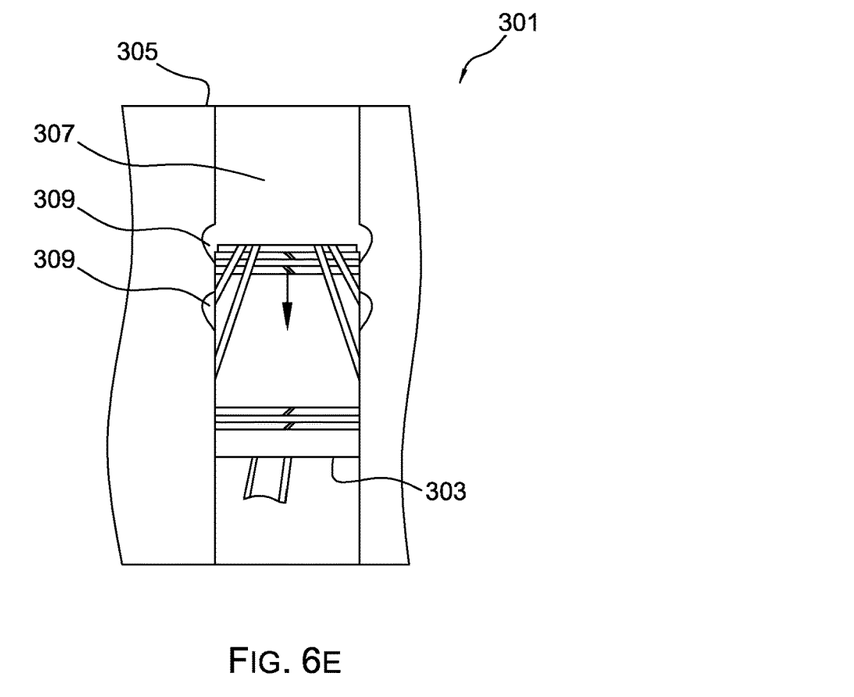

As shown in FIGS. 6B and 6D, the gases within the pockets 309 are able to travel through the conduits in the exemplary position of the piston head along the cylindrical wall, which in turn allows the gas to escape from the pockets to a position above the piston head.

Figure 7:
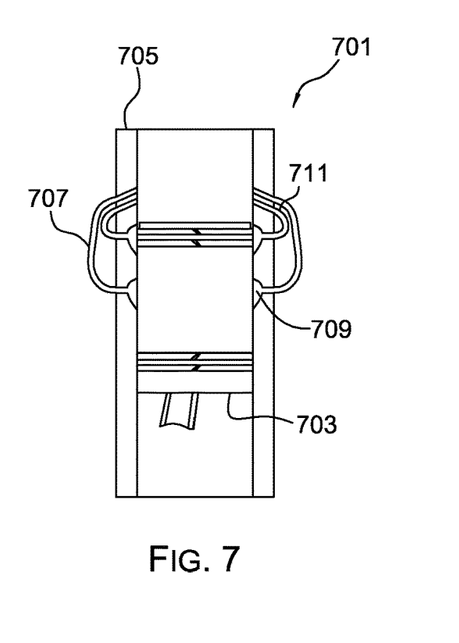
FIGS. 7 and 8 are section views in accordance with alternative embodiments of the present application.
Figure 8:
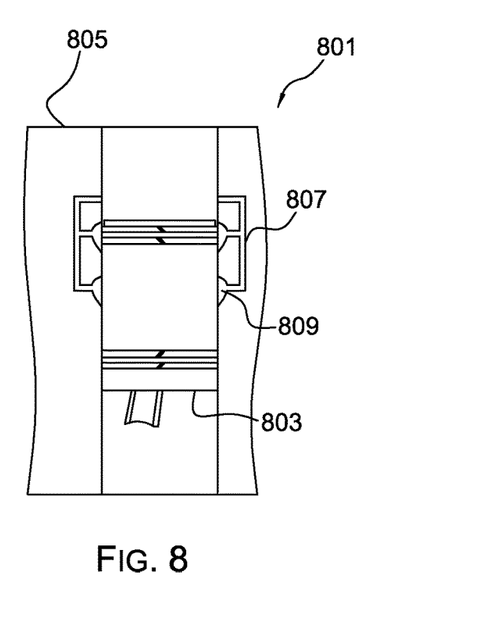

Referring now to FIGS. 7 and 8, section views of systems 701 and 801 are respectively shown in accordance with alternative embodiments of the present application. Systems 701 and 801 are substantially similar in function to system 301 and it is contemplated interchanging the features of the different types of the systems discussed herein.

In one embodiment, system 701 includes piston 703 and cylinder 705 with integral pockets 709. In this embodiment, external conduits 707 and 711 are used to facilitate the transfer of intake gases into the pockets 709 during the compression stroke.

In another embodiment, system 801 includes piston 803 and cylinder 805 with integral pockets 809. In this embodiment, the cylinder 805 wall contains integral conduits 807 which are used to facilitate the transfer of intake gases into the pockets 809 during the compression stroke.

Accordingly, the embodiments of FIGS. 7 and 8 depict alternative means to channel the gases from the pockets to a position above the piston head. In lieu of having the conduits disposed within the piston head, the conduits in these embodiments include the feature of having the conduits extend through the thickness of the cylinder walls.

Referring now to FIGS. 9 and 10A-10E in the drawings, an alternative embodiment is shown. System 901 is substantially similar in form and functions to one or more of the systems discussed above and incorporates the features discussed herein.

Figure 9:
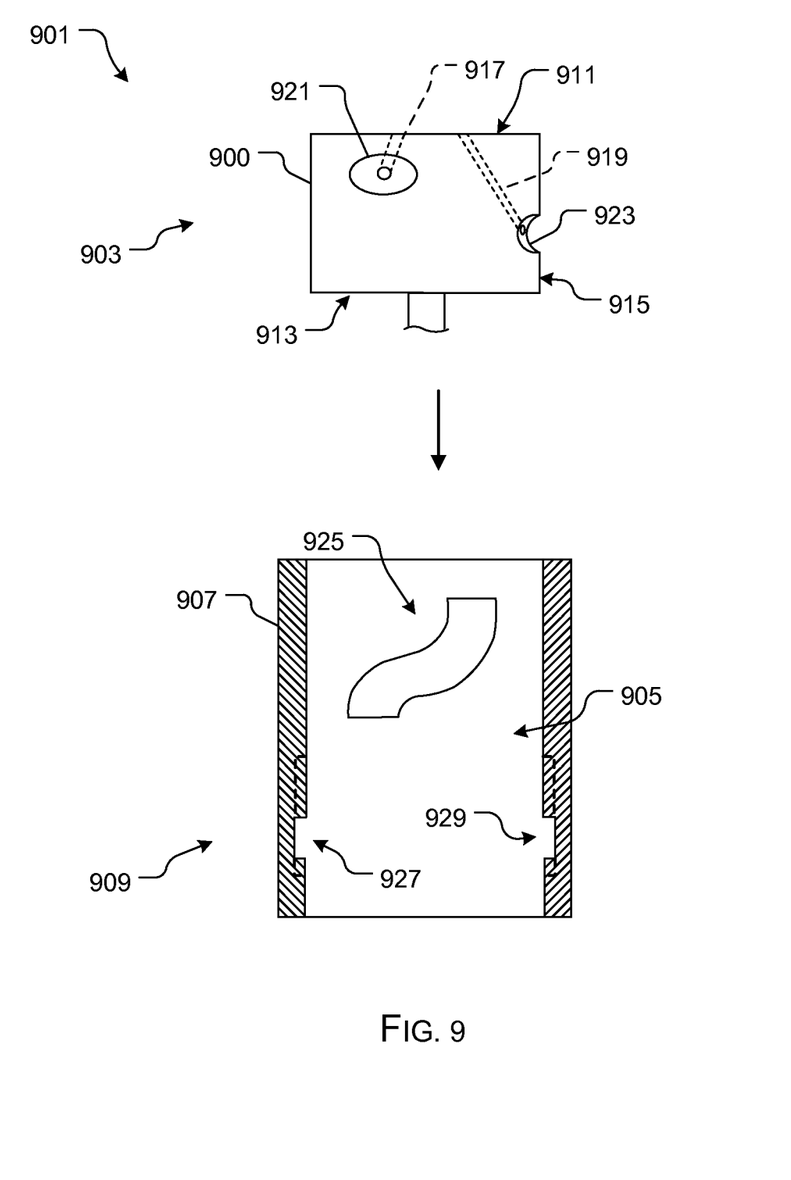
FIGS. 9 and 10A-10E are front views of a system in accordance with an alternative embodiment of the present application.
Figures 10A, 10B:
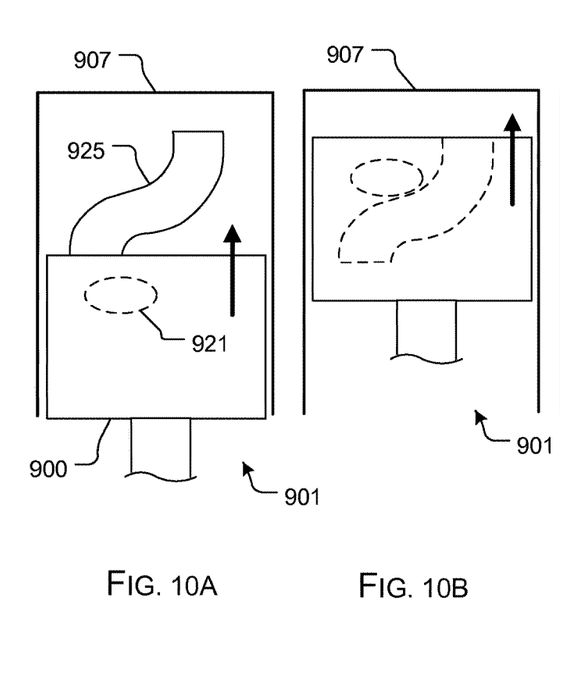
Figure 10C:
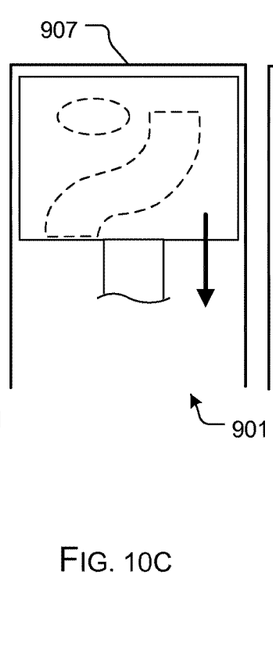
Figure 10D:
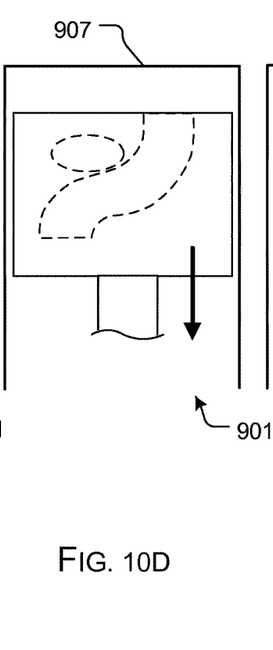
Figure 10E:
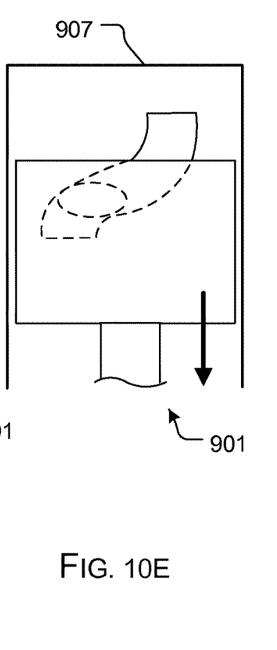

System 901 includes one or more of piston head 903 configured to slidingly engage within a cavity 905 of a body 907 of a housing 909. In the contemplated embodiment, the piston and housing are both cylindrical in shape; however, alternative embodiments could include other shapes and configurations.

Piston head 903 includes a body 900 having a top surface 911, a bottom surface 913, and side surface 915. One or more conduits 917, 919 extend from top surface 911 to one or more respective ports 921, 923 extending within the piston head from surface 915. The conduits and ports provide gaseous passages from the top surface to the side surface. This configuration allows gaseous communication to one or more channels 925, 927, and 929 extending partially through the thickness of the housing body 907, as shown in FIG. 9.

As shown in FIGS. 10A-10E, the movement of the piston head relative to the housing is shown.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A piston system, comprising;
   a piston housing having a cylindrical body and forming an opening;
   a piston head positioned within and slidingly engaged with the opening;
   a first conduit extending from a first opening at a side of the piston head to a second opening at a top surface of the piston head, the first conduit being straight from the first opening to the second opening;
   a first pocket extending partially within the cylindrical body of the piston housing;
   wherein the first pocket is configured to store gas and configured to temporary be in gaseous communication with the first conduit as the piston head slides within the piston housing.

2. The system of claim 1, further comprising:
   a second conduit extending from the side of the piston head to the top surface of the piston head;
   a second pocket extending partially within the cylindrical body of the piston housing;
   wherein the second pocket is configured to store gas and configured to temporary be in gaseous communication with the second conduit as the piston head slides within the piston housing.

3. The system of claim 2, wherein the first pocket is offset at a height relative to the second pocket.

4. A piston system, comprising;
   a piston housing having a cylindrical body and forming an opening;
   a piston head positioned within and slidingly engaged along an inner surface of the opening; and
   a first conduit extending from a top surface of the piston head through the piston head and to a side surface of the piston head; and
   a first pocket extending partially within a body of the piston from the side surface of the piston head and in gaseous communication with the first conduit;
   wherein the first conduit is straight.

5. The system of claim 4, further comprising:
   an elongated channel extending partially through the thickness of an inner surface of the piston housing;
   wherein the channel provides temporary storage of the gas as the piston head traverses within the opening of the piston housing.

6. The system of claim 5, further comprising:
   a second conduit extending from the top surface of the piston head through the piston head and to the side surface of the piston head;
   a second pocket extending partially within the body of the piston head from the side surface of the piston head and in gaseous communication with the second conduit;
   wherein the second pocket is configured to store gas temporary as the piston head slides within the opening of the piston housing.

7. The system of claim 6, further comprising:
   a second channel extending through the thickness of the body of the piston housing from the inner surface of the piston housing.

8. The system of claim 6, wherein the first pocket is offset at a height relative to the second pocket.

* * * * *